United States Patent [19]
Sahin

[11] 3,794,983

[45] Feb. 26, 1974

[54] COMMUNICATION METHOD AND NETWORK SYSTEM

[76] Inventor: Kenan E. Sahin, 711 N. East St., Amherst, Mass. 01002

[22] Filed: Apr. 17, 1973

[21] Appl. No.: 351,872

Related U.S. Application Data

[63] Continuation-in-part of Ser. No. 186,488, Oct. 4, 1971, which is a continuation-in-part of Ser. No. 819,395, April 25, 1969, abandoned.

[52] U.S. Cl. ....... 340/172.5, 179/15 A, 179/15 AL, 179/18 GF

[51] Int. Cl. .......................... H04b 1/38, G06f 13/00

[58] Field of Search ... 340/172.5, 146.3; 179/18 GF

[56] References Cited

UNITED STATES PATENTS

| | | | |
|---|---|---|---|
| 3,229,115 | 1/1966 | Amarel | 340/172.5 X |
| 3,262,099 | 7/1966 | Skiko et al. | 340/146.3 |
| 3,473,160 | 10/1969 | Wahlstrom | 340/172.5 |
| 3,496,382 | 2/1970 | Hendrix | 340/172.5 X |
| 3,680,056 | 7/1972 | Kropfl | 340/172.5 |

*Primary Examiner*—Harvey E. Springborn
*Attorney, Agent, or Firm*—Rines & Rines; Shapiro & Shapiro

[57] ABSTRACT

Communication methods in networks arranged and interconnected so that each memory-logic module of the network system can initiate an information request that will be propagated to the remaining modules in such manner that a module that is to respond to the information request can have its response transmitted along an efficient path to the module that initiated the request, though totally "uninformed" as to the location of the same; application of the networks embodying the communication methods to pattern recognition.

22 Claims, 12 Drawing Figures

SQUARE AND HEXAGONAL MODULE CHANNEL ARRANGEMENTS

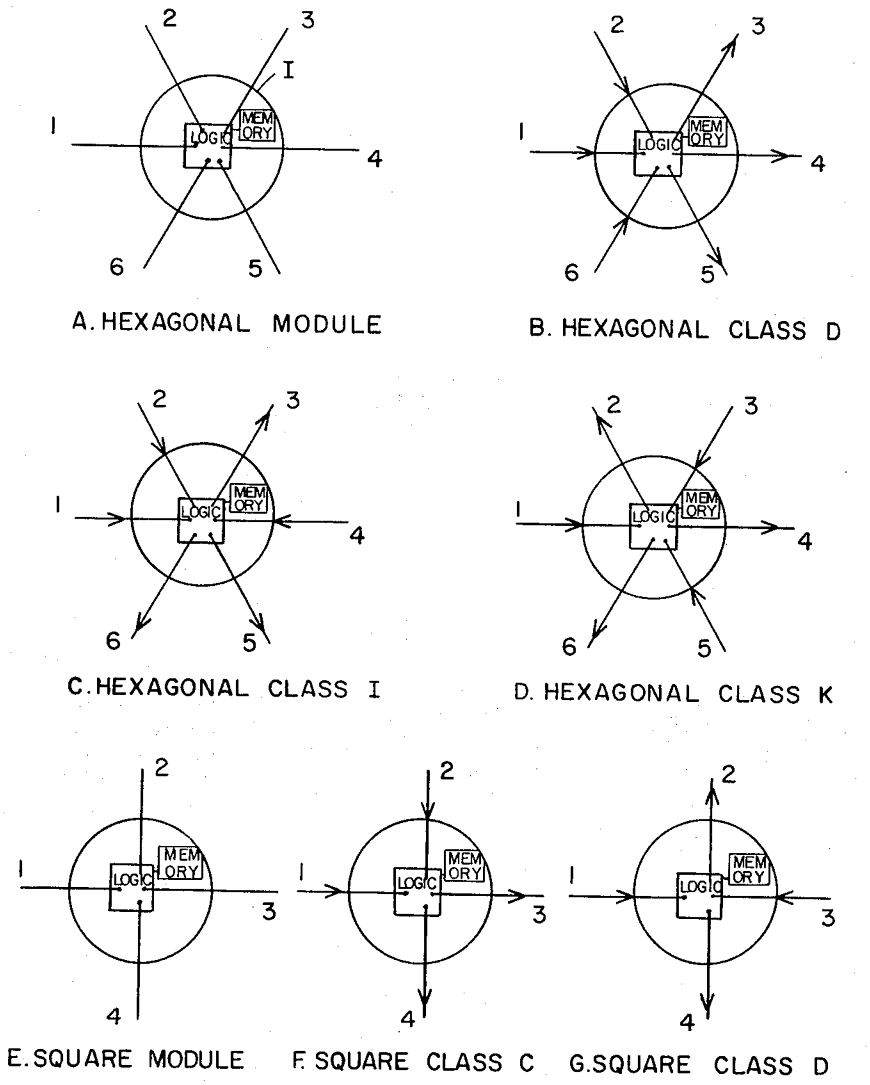
FIGURE I. SQUARE AND HEXAGONAL MODULE CHANNEL ARRANGEMENTS

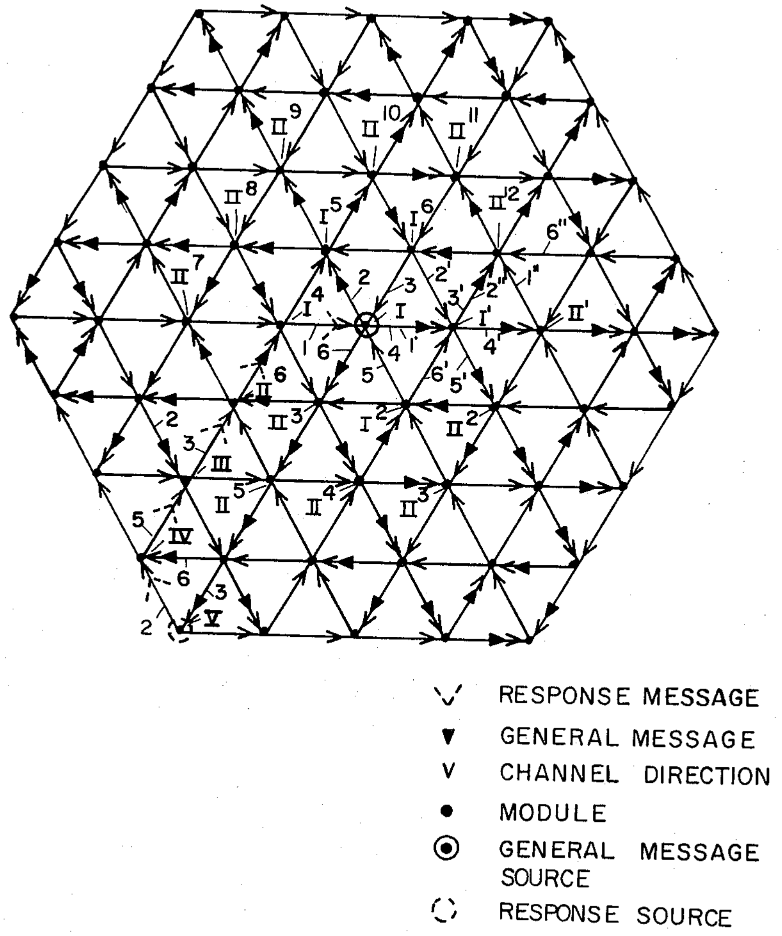
FIGURE 2. PROPAGATION PATTERN AND A RESPONSE PATH IN THE HEXAGONAL CLASS D AND K NETWORK CONSTRUCTION

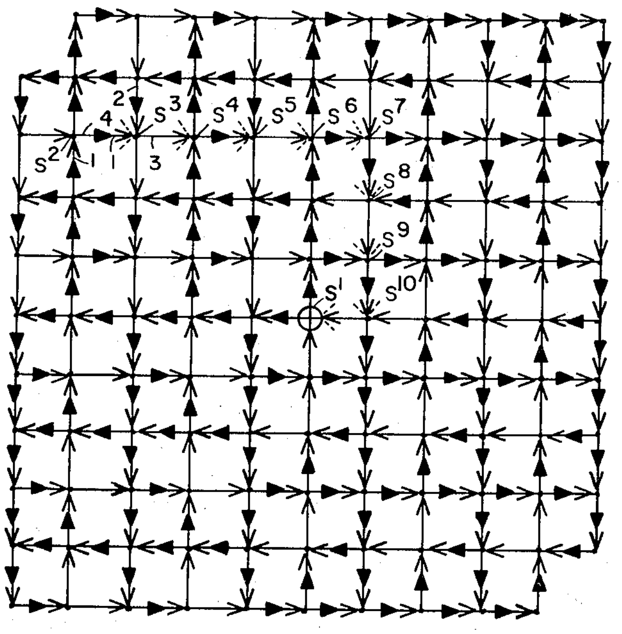
FIGURE 3. GENERAL MESSAGE PROPAGATION PATTERN AND A RESPONSE PATH IN THE SQUARE CLASS C NETWORK CONSTRUCTION

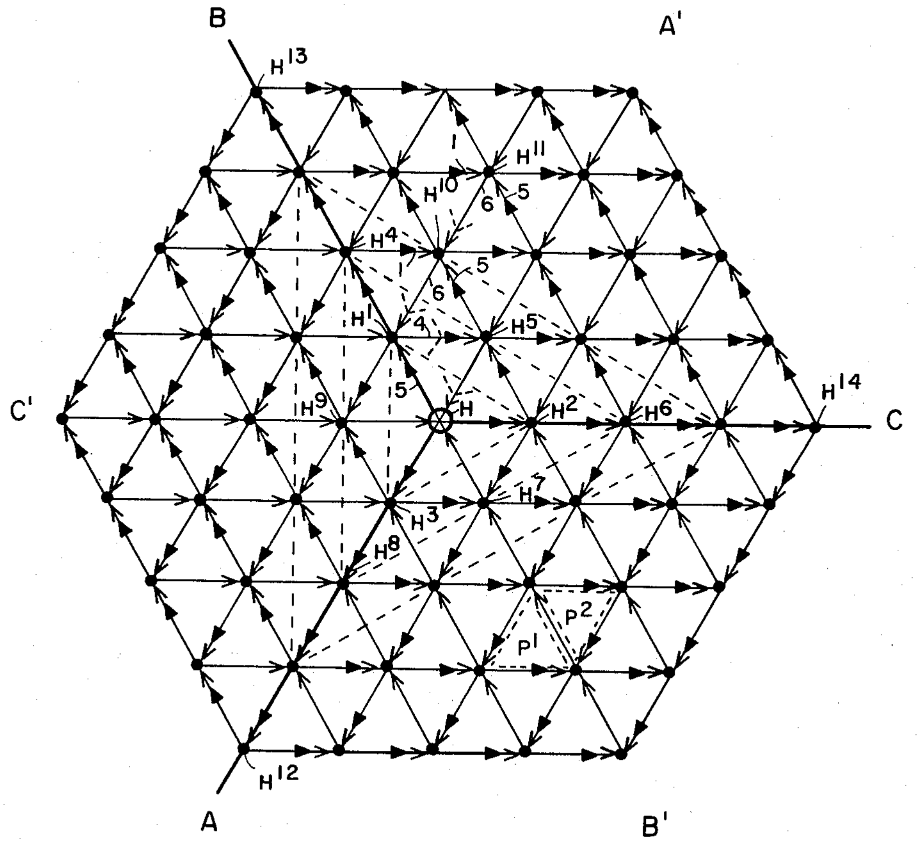
FIGURE 4. GENERAL MESSAGE PROPAGATION PATTERN AND A RESPONSE PATH IN THE HEXAGONAL CLASS K NETWORK CONSTRUCTION

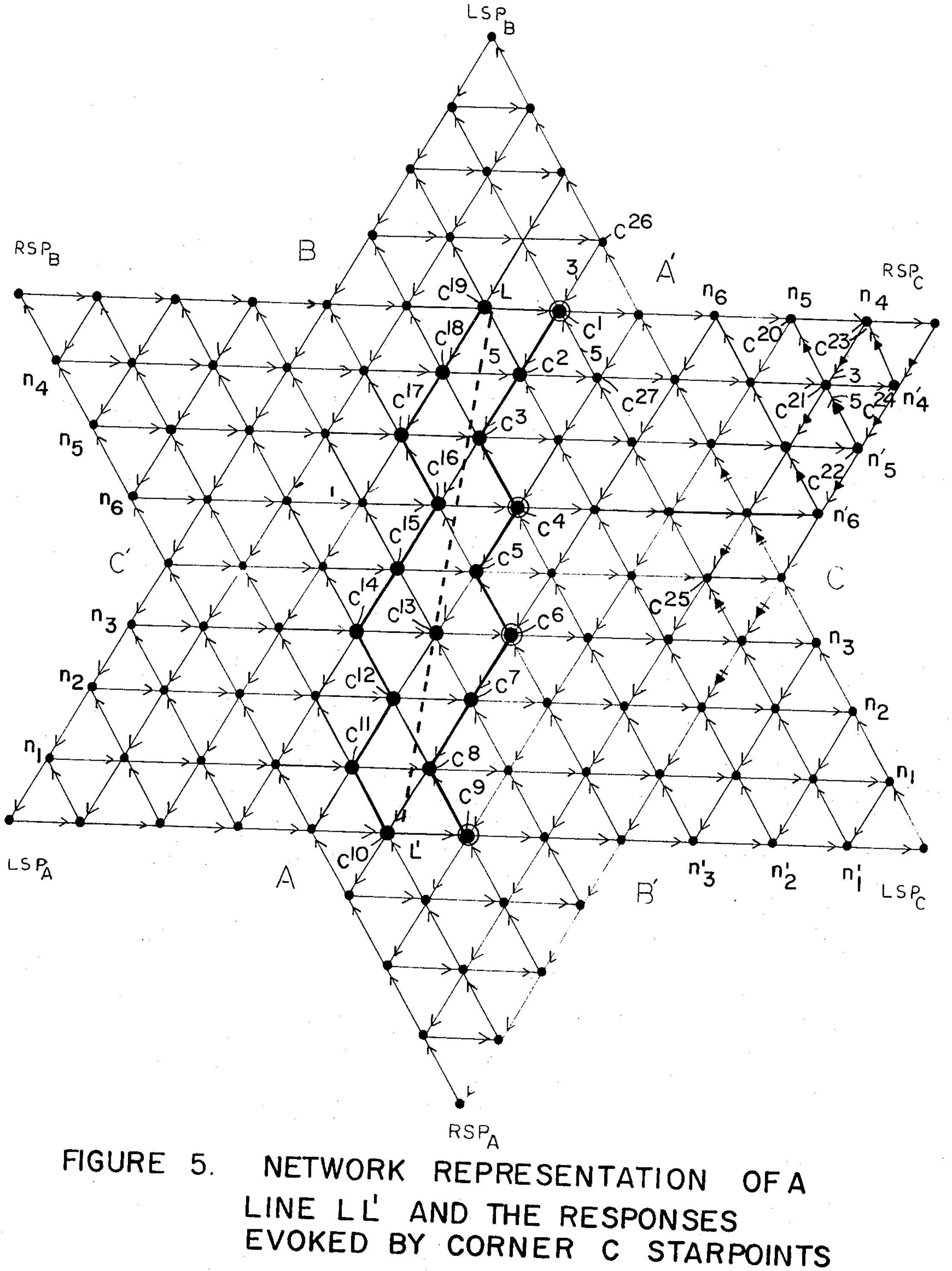
FIGURE 5. NETWORK REPRESENTATION OF A LINE LL' AND THE RESPONSES EVOKED BY CORNER C STARPOINTS

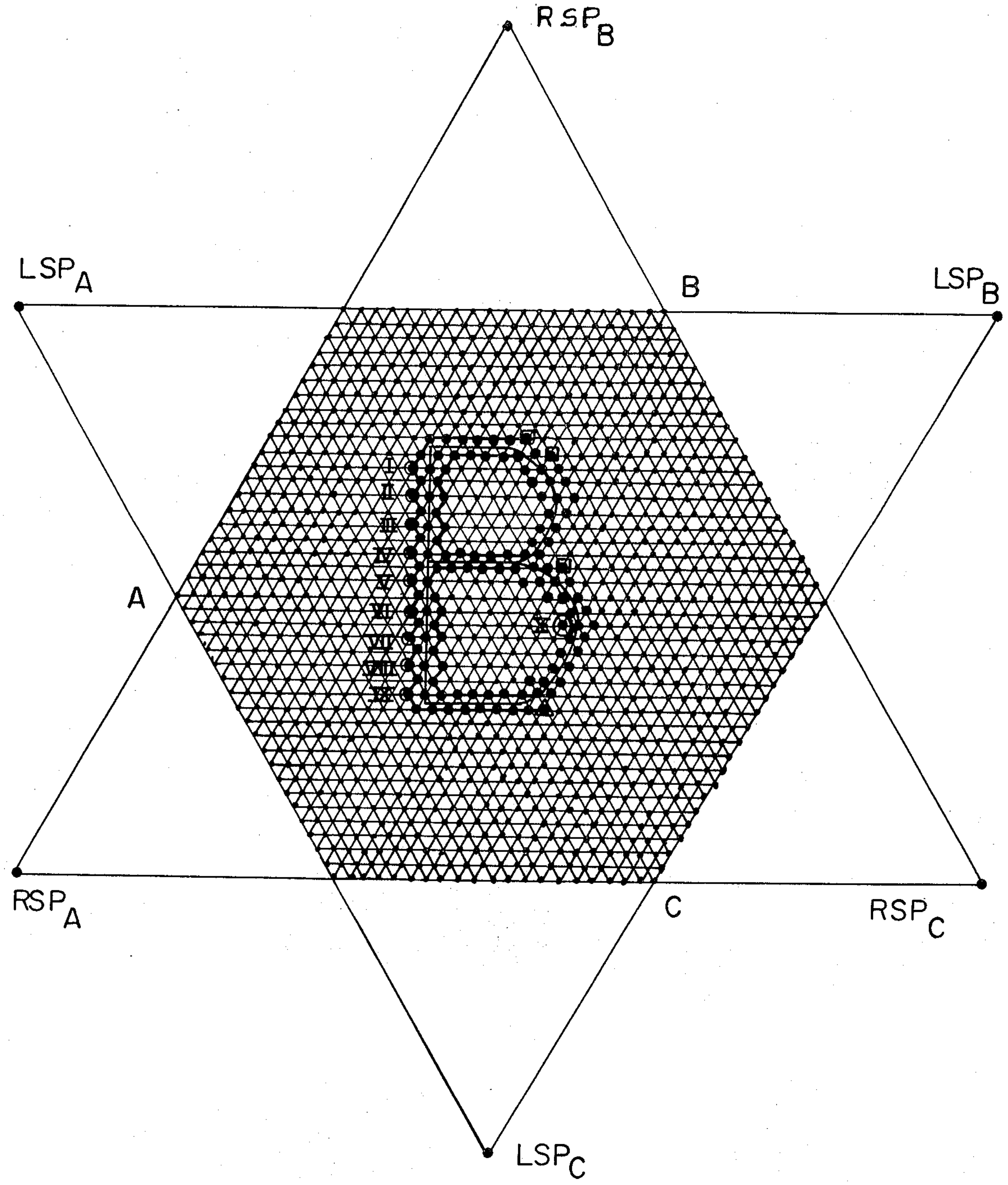
FIGURE 6. RESPONSES EVOKED BY LETTER B

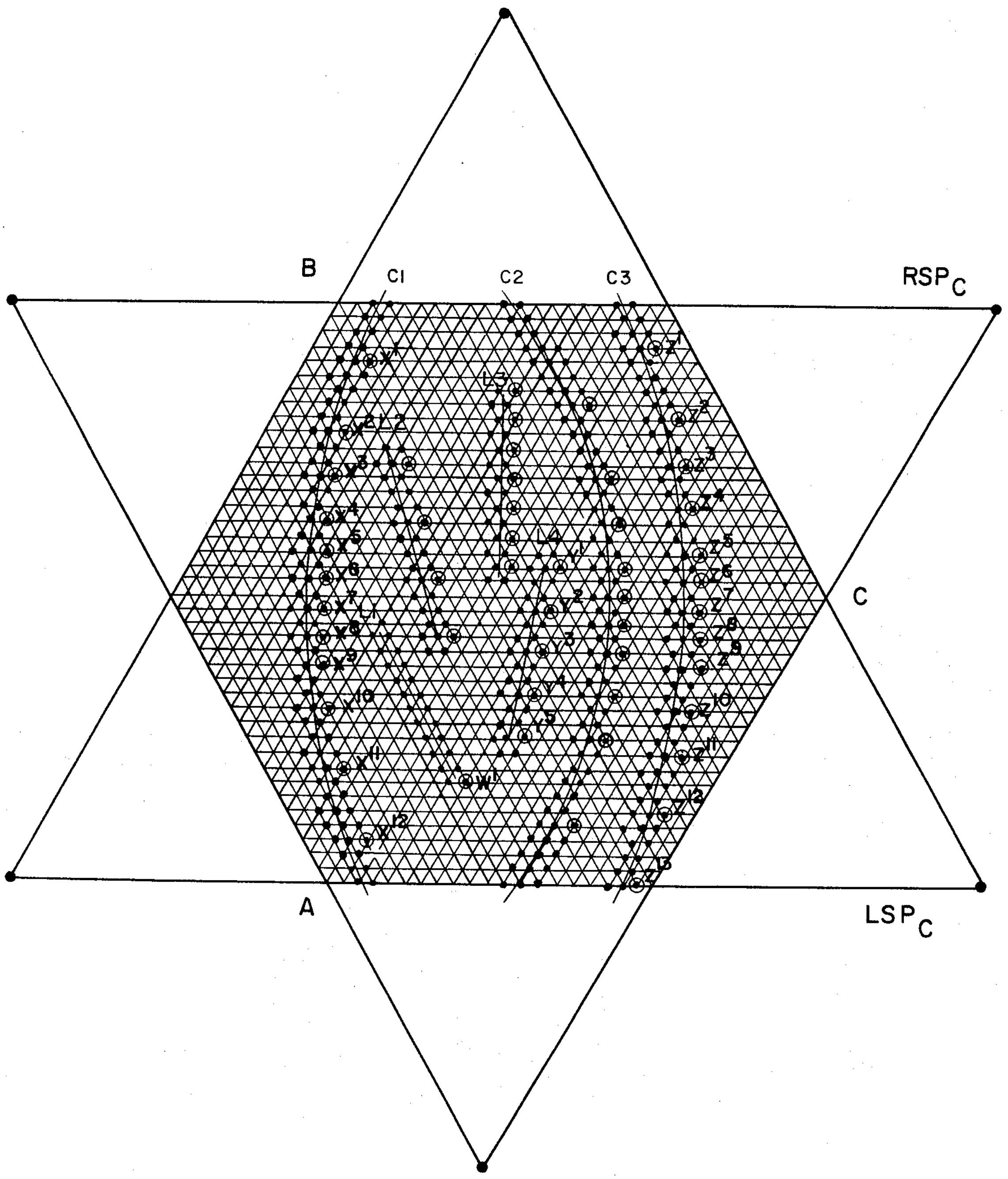
FIGURE 7. RESPONSES TO $RSP_C$ AND $LSP_C$ FROM VARIOUS LINE SEGMENTS

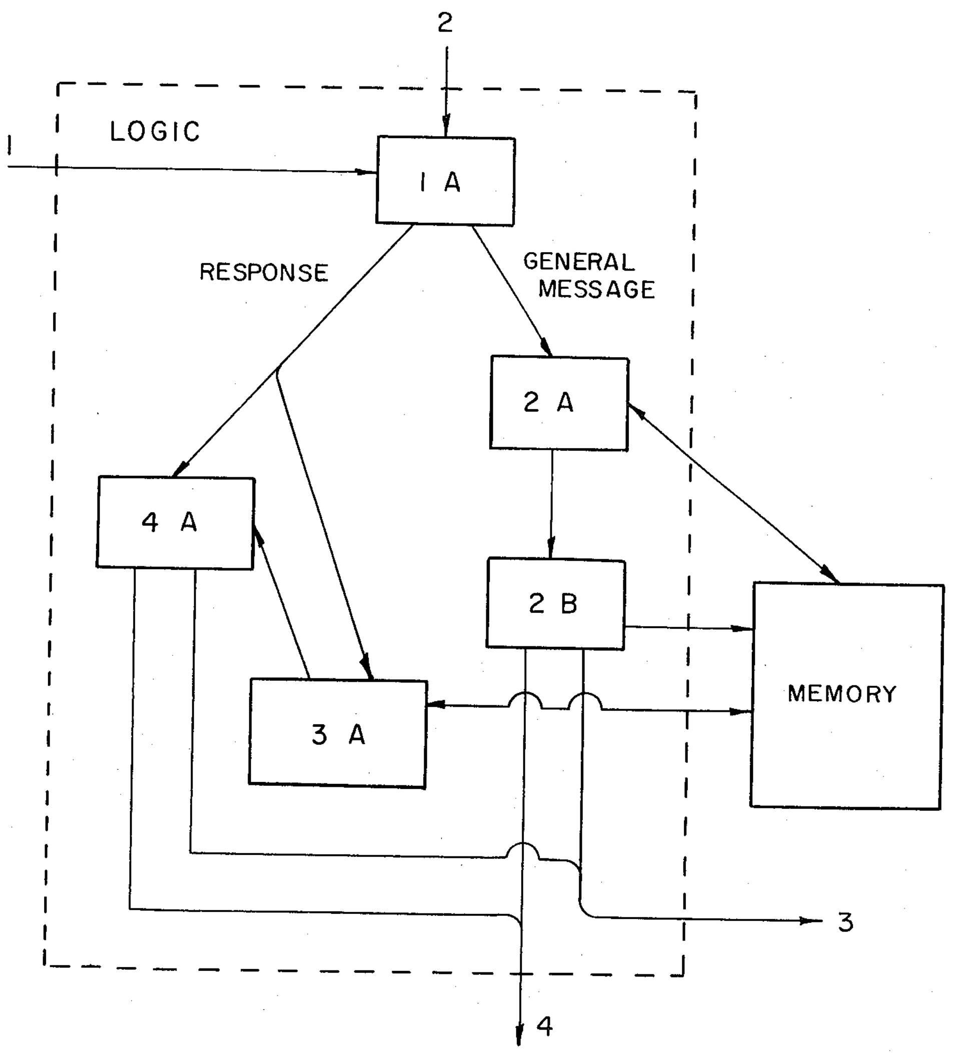
FIGURE 8. FUNCTION BLOCK DIAGRAM OF A SQUARE MODULE

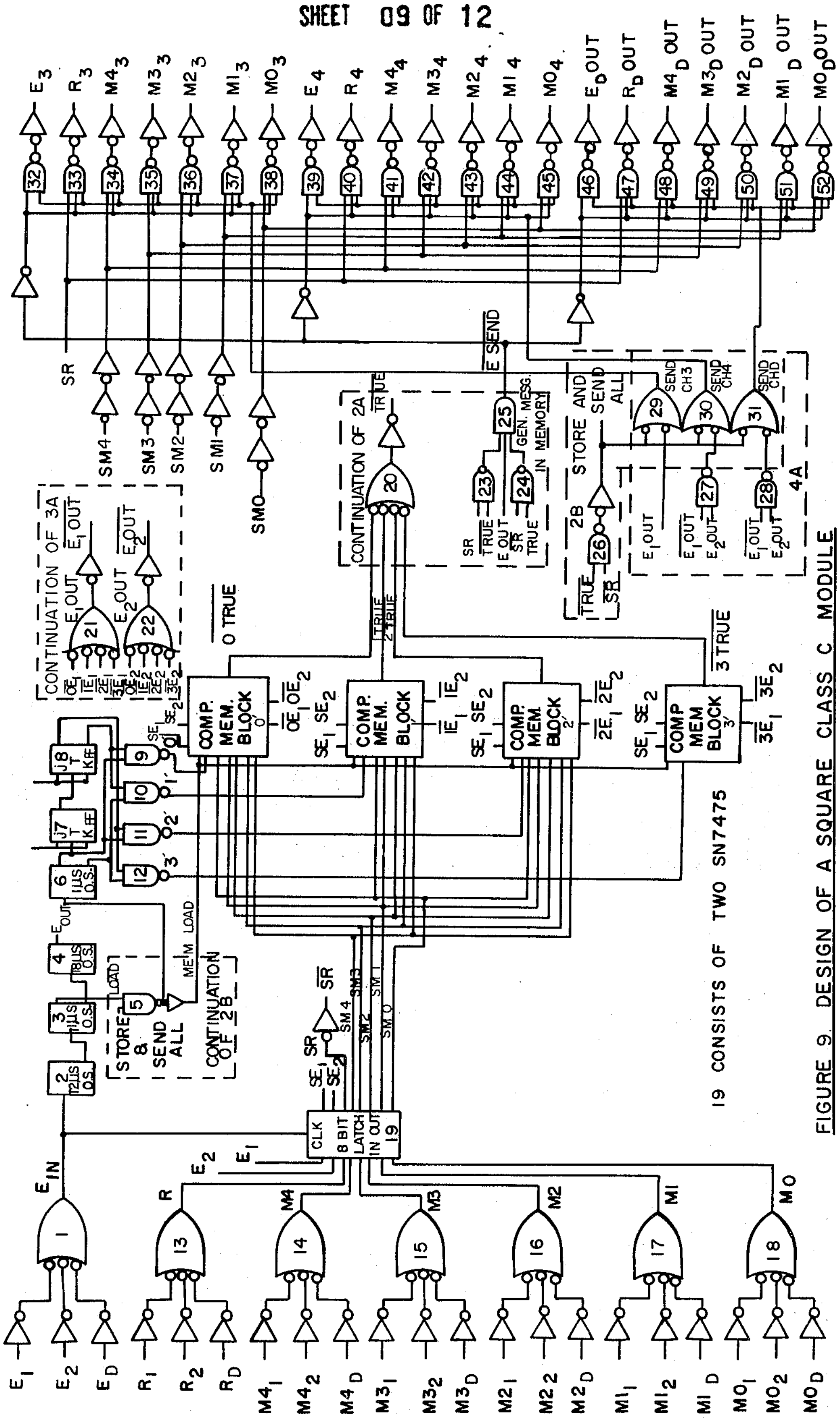
FIGURE 9 DESIGN OF A SQUARE CLASS C MODULE

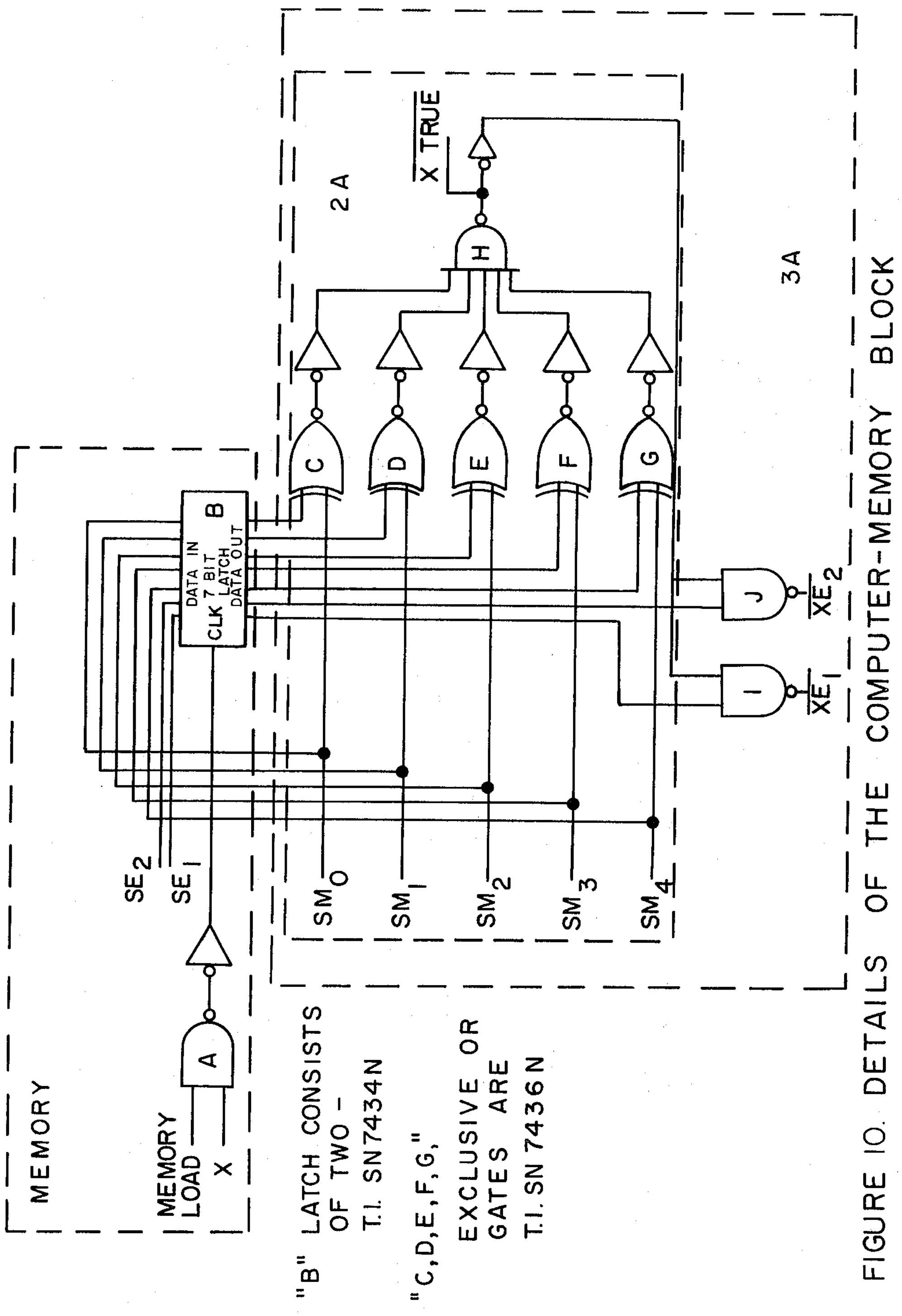
FIGURE 10. DETAILS OF THE COMPUTER-MEMORY BLOCK

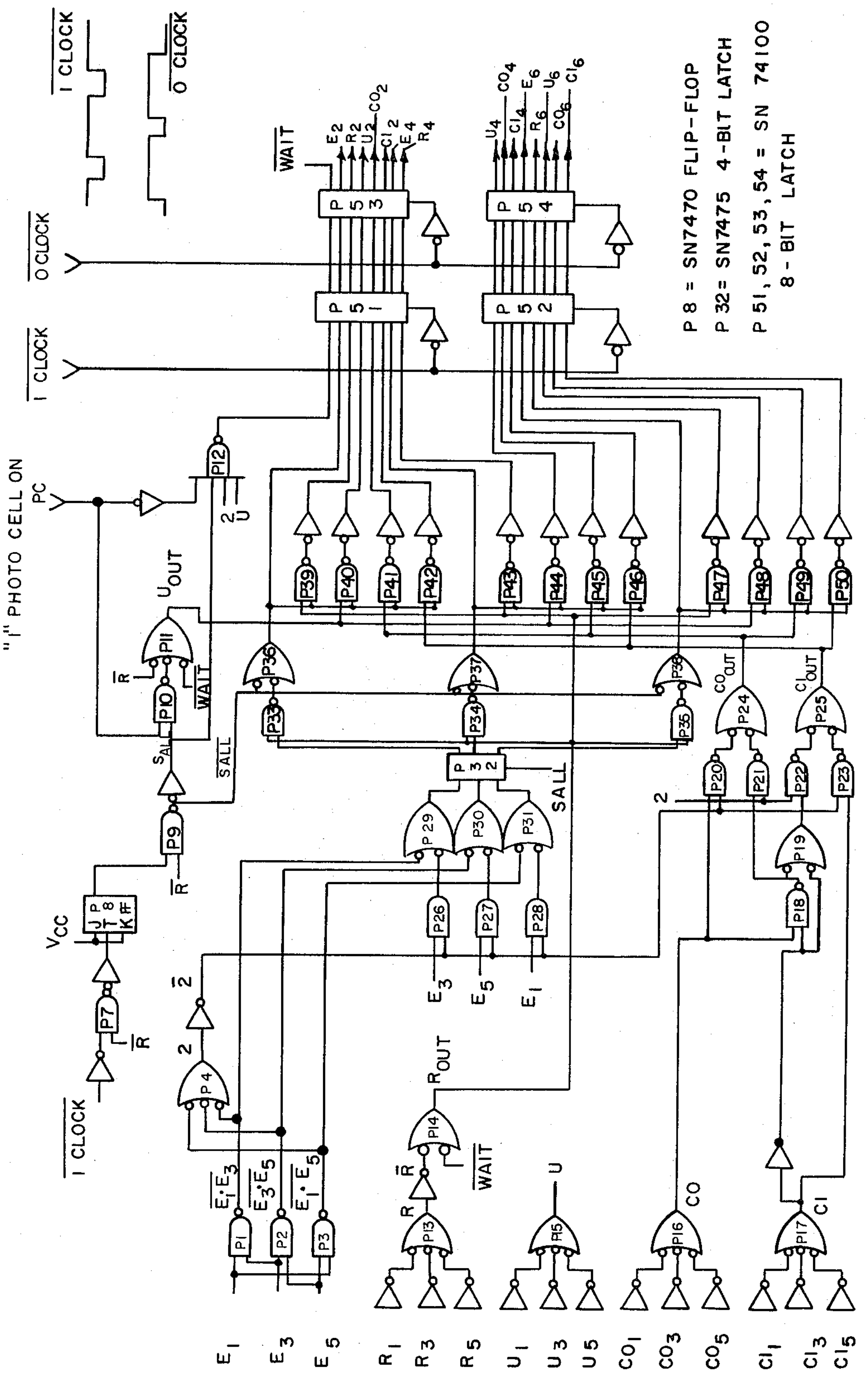
FIGURE 11. CIRCUIT DESIGN OF A MODULE FOR PATTERN RECOGNITION

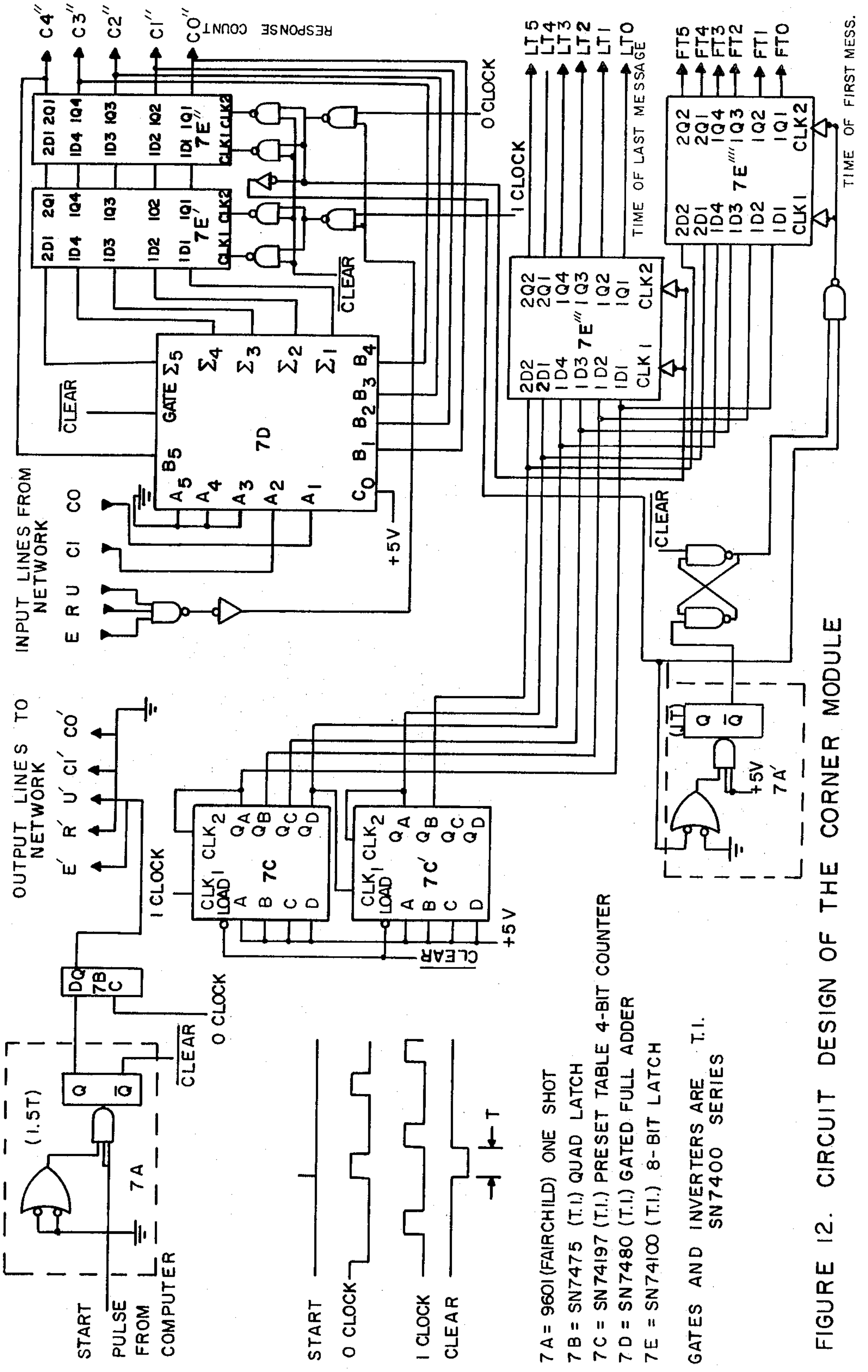
FIGURE 12. CIRCUIT DESIGN OF THE CORNER MODULE

COMMUNICATION METHOD AND NETWORK SYSTEM

This application is a Continuation-In-Part of Ser. No. 186,488 filed 10/4/71 which is a Continuation of Ser. No. 819,395 filed 4/25/69, and now abandoned.

The present invention relates to communication methods and systems being more particularly directed to methods of inter-connecting memory-logic modules to enable communication therebetween, and network systems embodying the technique of such methods that enable intercommunication without knowledge or determination of the location of all the other modules.

There are innumerable varieties of communications networks and systems that have been evolved and employed throughout the years for enabling request messages to be injected into the system and, where appropriate, for providing the necessary direction of the message to a desired location to produce a desired response from the system. Examples of such communication systems include conventional computers, such as the IBM 7094 type, that, on request, are called upon to retrieve information stored therein; telephone and related systems wherein dial information is to be sorted and transmitted along predetermined channels to specified locations; and pattern recognition systems wherein it is desired to determine the presence of a predetermined pattern of figures or other information.

The many different types of networks and communication techniques that have been evolved throughout the past decades for the solution of problems attendant upon such communications applications have involved a myriad of different types of approaches to network systems. Basically, however, all presently known systems of this character are subject to rather common disadvantages that have not, until the advent of the present invention, been completely obviated.

Specifically, in the case of many computers of the above-described type, a system of addressing the core memory is needed which requires an interrogation scheme to locate some module or word or other information irrespective of its content. This necessitates identifying each location in the memory with a particular number or reference and providing direct access to each such location from a central unit.

To overcome some of these complexities, computers have been designed with so-called associative memory systems including, for example, distributed memory and logic systems which do enable the retrieval of data without knowledge of the location of the data. The techniques for effecting this, however, disadvantageously require, again, the employment of the central unit which must be connected to all the modules or cells of the memory system. Should the central unit fail, the whole associative memory retrieval system fails.

An object of the present invention, accordingly, is to provide a new an improved method of and system for computer and similar retrieval communications, that shall not be subject to any of the above-described disadvantages. In summary, the invention enables communication among memory-logic modules without the necessity for addressing schemes, without information as to the location of all the other modules and without the necessity for a central unit that is connected to all of the modules; The invention, enabling any module to initiate an information request, to propagate the same to all the remaining modules, to enable that module which is to respond (as when it contains the information to be retrieved) to have the retrieved information transmitted along an efficient path to the requesting module (and without any cycles in the response paths) and with each module totally "ignorant" of, or unaware and uninformed as to the location of the other modules except for a few adjacent modules to which it is directly connected.

In addition, the present invention overcomes the further limitation of computer associative memory systems which can fulfill only one search request at a time; the invention providing for simultaneous operation with more than one search request.

With regard to telephone communication applications, the same problem of addressing is present, and again it is essential that the telephone exchange, into which the dialed request is transmitted, "know" the location of all the telephones or the channels to which telephones are connected. Again, the method and systems underlying the present invention obviate this requirement, as before explained, and do so with efficiency.

As for the pattern recognition problem, present day systems, as described, for example, in Chapter Six of "Recognizing Patterns--Studies in Living and Automatic Systems", Editors Kolers & Eden, MIT Press, 1968, are subject to the disadvantages of requiring a central computer to analyze the scanned data, and require complicated matching of the scanned data with stored data.

In accordance with the present invention, on the other hand, the application of the methods and systems thereof to pattern recognition do not involve any of these disadvantages.

Still a further object is to provide a new and improved system that enables study of neural networks and the like in living bodies in view of (1) the great flexibility of the module arrangement of the invention, (2) its utilization of one-way connections found in such neural systems, and (3) the lack of a central unit, which is also lacking in such neural systems. The brain, for example, appears to be lacking such unit and, indeed, it can be divided and still operate.

Still another object is to provide a new and improved network system of more general utility, as well.

Another feature of the invention resides in the novel method of communication-response underlying the same which, once more, is broadly applicable to many different types of systems and problems where the advantages of the invention are sought. For purposes of illustration, the invention will be described in a preferred mode in connection with electrical or electronic network systems; though it will be evident that the principles underlying the system and method of the invention are not restricted to such techniques but may be practiced with a host of different types of apparatus and even operators. While, moreover, the invention will be described in connection with two-dimensional networks, it will be obvious that this may readily be extended into three-dimensional networks in accordance with well-known technology, where desired.

The invention will now be described in connection with the accompanying drawings, wherein:

FIGS. 1A through 1G are block diagrams illustrating preferred types of memory-logic modules, cells or units, which may be employed in connection with the present invention;

FIG. 2 is a diagram of a network system embodying a large number of modules of the type described by FIGS. 1B and 1D, for example, interconnected and operating in accordance with the methods and systems of the present invention, showing typical propagation characteristics of the network and the routing of a response message;

FIG. 3 is similar to FIG. 2 except that it is constructed with modules of the type described in FIG. 1F;

FIG. 4 is similar to FIG. 2 except that it is constructed with modules of the type described in FIG. 1D;

FIGS. 5, 6, and 7 are network diagrams demonstrating the pattern recognition features of the network; FIGS. 8, 9, and 10 are block diagrams of the logic and memory configurations of the module in FIG. 1F employed in FIG. 3;

FIG. 11 is the block diagram of the logic and memory configuration of the module in FIG. 1D as employed in the pattern recognition mode of FIGS. 5–7.

FIG. 12 is a diagram of the modules that inject messages into the network and collect the responses therefrom, as utilized in FIGS. 5–7.

Referring to FIG. 1A, a preferred memory-logic module is illustrated as 1 having, for example, six bidirectional channels or connections being numbered 1, 2, 3, 4, 5 and 6. This constitutes, in effect, a six-sided or hexagonal module. The invention pertains to networks of bi-directional channels, as well as to networks of one-way channels conducting either away from a module or toward it. Various arrangements of one-way channels in the hexagonal module may be employed, several of which are illustrated in FIGS. 1B, 1C, and 1D. FIG. 1E shows a square module of bidirectional channels 1, 2, 3 and 4. FIGS. 1F and 1G illustrate some arrangements of one-way channels in the square module. In the embodiment of FIG. 1D, for example, channels 1, 3 and 5 bring messages to the module, while channels 2, 4 and 6 take messages away. This is arbitrarily called a "Class K" operation. In FIG. 1B, on the other hand, a so-called "Class D" operation is illustrated where channels 1, 2 and 6 bring messages to the module while channels 3, 4 and 5 carry messages away. In FIG. 1C still another arrangement is illustrated, termed "Class 1" wherein the input channels are 1, 2 and 4, and the output channels are 3, 5 and 6. Clearly other arrangements and combinations of these classes of operation may be used, also.

Similarly, in the square module embodiment of FIG. 1F, channels 1 and 2 bring messages in, and channels 3 and 4 transmit messages out; whereas in the module of FIG. 1G, channels 1 and 3 are input channels, and channels 2 and 4, output channels.

In each module, irrespective of its geometric configuration, however, there is provided a logic unit and a memory unit, so labelled, constructed to operate in accordance with decision rules hereinafter explained. Briefly, each module receives two types of messages: a general message also referred to herein as an "information request"; and a response message also referred to as response. Each module stores in its memory the identification of the channel(s) upon which the general message first arrives and passes the said message out on all outgoing channels. Later, when and if a response arrives, it is sent out on one outgoing channel which is determined by decision rules based on the identity of the channel(s) upon which the general message had first arrived, as explained later.

The memory unit of each module can be in array or circular form, with the capacity depending upon the intended application, though it must be big enough to hold the information on general message first arrival channels. If more than one general message is expected between response arrivals, then the memory must be able to hold identifiers of the different general messages and identities of the associated first arrival channels.

Assuming that several general messages arrive between responses, the logic unit of each module determines whether the incoming message is a general message or a response. This can be readily effected, if the messages are being transmitted as a series of pulses, by using the first pulse to indicate the nature of the message; such as a "zero" to denote a general message, and a "one" to indicate a response.

FIG. 2 illustrates a typical network of Class K and Class D hexagonal modules. In the center of the sheet the module 1 is represented by a dot which may assume the constructional form of FIG. 1. It will be observed that there are a plurality of such modules distributed throughout the whole network, each being represented by such a small dot. The centermost module 1 is shown, for illustrative purposes, as provided with one-way channel connections of the Class K type (FIG. 1D) in which the arrowheads (V) on the channel connections 2, 4 and 6 are shown pointing away from the module 1, representing transmitting or output channels in the direction away from the module, and channel connections 1, 3 and 5 are provided with inwardly pointing arrows, representing the receiving of signals fed one-way into the module 1. Similar conventions are used in connection with the channel connections of all of the other modules of the network system of FIG. 2. In this particular example, the right-hand adjacent module $\mathbf{1^1}$ is illustrated with its connections of the Class D type (FIG. 1B), with its channel connection $\mathbf{1^1}$, (connected to the channel connection 4 of module 1), its channel connections 2′ and 6′ having incoming arrows, and its channel connections 3′, 4′ and 5′ having outgoing arrowheads. This network thus represents a hybrid or mixture of modules 1 — 1′, etc. connected either for Class K or Class D operation. Although some of the modules have their channels rotated from the positions of FIG. 1, such as $\mathbf{1^2}$, the class remains the same and the same rules hereinafter apply. Also some channels are missing from modules at the perimeter of the network. The missing output channels are merely connected to one of the existing output channels. Otherwise the edge modules operate just like any other module.

In accordance with the invention, the network of FIG. 2 comprises thus a plurality of memory-logic module units each adapted to receive an input message and, depending upon the message type, to transmit an output message. Groups of these module units are connecting in polygonic assemblies successively, at least in part, circumscribing one another. For example, the modules $\mathbf{1^1}$, $\mathbf{1^2}$, $\mathbf{1^3}$, $\mathbf{1^4}$, $\mathbf{1^5}$, $\mathbf{1^6}$ comprise a hexagon assembly or group circumscribing the central module 1; and this hexagonal assembly is in turn circumscribed by the next outer hexagonal assembly or group embodying the module $\mathbf{11^1}$, $\mathbf{11^2}$, $\mathbf{11^3}$, $\mathbf{11^4}$, $\mathbf{11^5}$, $\mathbf{11^6}$, $\mathbf{11^7}$, $\mathbf{11^8}$, $\mathbf{11^9}$, $\mathbf{11^{10}}$, $\mathbf{11^{11}}$, $\mathbf{11^{12}}$; and so on for the complete network systems. Further, in accordance with the invention, each module unit of an assembly is connected only with adjacent units of another assembly. For example, the module $\mathbf{1^1}$ is shown connected to the adjacent modules $11^{12}$ by one-way channel conductor 3′; module $11^1$ by channel conductor 4′; module $11^2$, by conductor 5′, of the next assembly $11^1$ to $11^{12}$, and so on for the rest of the network. These connections, as before stated, comprise one-way connections between the output connections of each module unit and the input connections of the adjacent module to which it is connected (such as the one-way outgoing connections 3′, 4′ and 5′ which serve as input connections to the respective modules $11^{12}$, $11^1$ and $11^2$ ). Furthermore, the arrangement of channels is such that a path exists between any two modules so as to allow communication between any two modules, as for instance between $1^6$ and $11^2$ via channels 2′ and 5′.

It has been found that by virtue of this type of connection, the entirely novel result is attained that the network constructed as shown in FIG. 2, for example, will enable any module to initiate a request message signal and transmit the same to every other module in the network and that the other module (or modules) that contains the desired responses, will be caused to transmit the response through its adjacent assembly modules and their successive assembly modules automatically back to the original module that is the source of the request message, all without "knowledge" of where the request message came from, in so far as the plurality of modules in the network may be concerned.

It remains to be explained how this takes place. Suppose, for example, that a request message (general message) initiates with the centermost logic-memory module 1 in FIG. 2. The solid heavy arrowheads (▼) in FIG. 2 indicate how this message will first arrive at a module, though the same message will appear on other channels of the same module certain times later, which later arrivals are rejected as later discussed. For purposes of illustration, let it be assumed that the response to the request message is contained in the Class K module V (though the source of the request message, module 1, doesn't "know" this fact in advance). When the request message (general message) arrives at module V, that module emits a response message. It is desired that some sequence of modules between V and 1, though each is completely independent of and unaware of the others, acts collectively such that the response message from module V reaches module 1 through a reasonably short path and with no cycling.

This is achieved by having each module which receives the response, route this response solely on the basis of the identity of channel(s) upon which the request message first arrives. These rules or algorithm for Class K and Class D modules are as follows:

TABLE 1

| | Input Channel(s) Receiving Request Message | Output Channel For Response Message When and If It Comes |
|---|---|---|
| Class K | | |
| | 1 or 1 and 5 | 6 |
| | 3 or 1 and 3 | 2 |
| | 5 or 3 and 5 | 4 |
| Class D | | |
| | 6 or 6 and 1 | 5 |
| | 1 or 6 and 2 | 4 |
| | 2 or 1 and 2 | 3 |

The response message routing rules are dependent only on the channels and not on the spatial orientation of modules. The channel numbers continue to designate the associated channels regardless of the orientation of the channels on the diagram. For example, the input channels of module $1^1$, which is of Class D, are designated as 2′, 1′, 6′. The input channels of module $11^{12}$, which is also Class D, are designated as 2″, 1″, 6″, despite the different orientation of $11^{12}$. In this manner the channel relationship of FIG. 1C is preserved. In applying the response routing rules primes etc. will be dropped in designating channels, as for instance in module 111.

In FIG. 2, the module V being a Class K type (FIG. 1D) receives the general message along its input channel 3 and in accordance with the routing rules transmits its response message on outgoing channel 2. Similarly module IV will pass the response message along channel 5 since it is of the Class D type (FIG. 1B) and received the general message on channel 6. Module 111 receives the general message on channel 2 and so the response goes out on 3 and so on for $11^6$ and $1^4$. Thus the response will travel the path marked with dotted arrows.

It will be seen that in this manner, a response emanating from any module will reach the source module 1 through a cycle-free and reasonably short path. Clearly, any module can act as the general message source and not just the central module 1.

FIG. 3 shows a network constructed with Square Class C modules of FIG. 1F. Again each module is connected to its adjacent neighbors with one-way channels and in such a way that a path exists between any pair of modules. The same conventions of FIG. 2 are used to shown channel direction, general message first arrival channels and response routes. For illustration purposes the centermost module $S^1$ is chosen as the initiator of the general message. The rules for routing responses are contained in Table 11.

TABLE II

| Input Channel(s) Receiving Request Message (General Message) | Output Channel for Response Message When and If It Comes |
|---|---|
| 1 | 4 |
| 2 or 1 and 2 | 3 |

Assume module $S^2$ has the response to the general message initiated at $S^1$. Since it will first receive the general message on incoming channel 1 the response will be routed to outgoing channel 4 of $S^2$. $S^3$ will receive the general message on channels 1 and 2; so the response message will go out on channel 3 and so on for $S^4$–$S^{10}$ until it gets to the general message source.

FIG. 4 is a network constructed with Hexagonal Class K modules. Arbitrarily module H has been chosen as the source of the general message. Again heavy arrows (▼) show the pattern of general message first arrivals at each module. The response routing rules were given in Table 1. Assume module $H^{11}$ towards the top of the figure contains the response. Since the general message will have arrived on input channels 1 and 5, the response is routed to output channel 6. $H^{10}$ having received the general message also on 1 and 5 will route the response on 6. $H^1$ will have received the general message on 5 so the response goes out on 4 and so on until it reaches H the source module.

Response routing after the propagation of a general message can be achieved also in networks constructed with modules having two-way channels such as those in FIGS. 1A and 1E. When a network is suitably constructed with one-way channels as for instance in FIG. 2 or FIG. 3, the general message propagation times and response return times are about the same as those of a network of similar structure but with two-way channels, but the logic and memory requirements are significantly less in networks with one-way channels. This is so because a two-way channel is really equivalent to two one-way channels of opposing directions. Hence in a, for instance, hexagonal two-way channel network each module looks at six incoming channels and six outgoing channels to perform the same task.

The manner in which inputs be they responses or general messages are introduced to the network and outputs extracted from it depends upon the particular application. For instance, in the pattern recognition application to be described shortly, the general messages are injected into the network at the corners but responses are generated by modules and collected from the corners. In a very general communication task as among remotely located computers, it would be desirable to externally input general messages and responses as well as extract the same at each module of the network. Then an extra input channel from and an extra output to the external device (e.g., the computer) would be added at each module. The detailed discussions of module construction in conjunction with FIG. 9 make allowance for these extra channels.

A further feature of the invention resides in the fact that networks operated in accordance with the method underlying the invention also possess inherent pattern recognition capability; for example, readily distinguishing the angular orientation and length of straight lines, detecting curvature, and providing a method for recognizing alphanumeric characters of a particular font.

To illustrate this feature of the invention, let it be assumed that overlying the network there is a bank of closely packed photocells or other light sensitive devices, each triangular in shape with equal sides, and positioned over the triangles formed by the channels in a hexagonal network. The positioning of two such photocells, $P^1$ and $P^2$, have been illustrated in the lower right side of FIG. 4. Each photocell is connected to the three modules at its three vertices. Thus when the photocell is intercepted by an image, all three modules that are connected to it are "activated" or "turned on." Since each module is surrounded by six triangular regions and hence by six vertices of six photocells, it can be "turned on" by any of these six photocells.

Thus operated the bank of photocells converts a projected image, which is typically continuous, into a discreet representation upon the network--a common procedure in many pattern recognition approaches.

Discretization is illustrated for the image of a thin line $LL^1$ appearing in FIG. 5, which reproduces FIG. 4 with modifications to be explained shortly. Whenever the image enters or traverses a triangular region formed by the channels of the network, the three modules at the vertices will be activated via the associated photocell. Thus modules $C^1$ – $^{C19}$ will be activated by $LL^1$.

Let us return to FIG. 4 to make some observations about the propagation of the general message. Except along the axes (always defined relative to the general message source) H-B, H-C, and H-A everywhere else the general message arrives upon a module simultaneously on two channels. Furthermore, there are three regions in which the arrivals patterns are uniform. In region HBA'C the general message arrives upon input channels 1 and 5. In region HCB'C simultaneous arrivals are on input channels 1 and 3 whereas in HAC'B they are 3 and 5. Now it follows that if module $H^{12}$ at corner A were emitting the general message the entire hexagonal network would behave like region HBA'C; that is all the modules except those along the axes of $H^{12}$ (A–B' and A–C') would receive the general message simultaneously on channels 1 and 5. This can be seen by visually shifting module H to corner A. Likewise emission form $H^{14}$ at corner C would result in simultaneous arrivals on channels 3 and 5, and corner B emissions, on channels 1 and 3. These three corners A, B, and C whose emissions, on channels 1 and 3. These three corners A, B, and C whose general message emissions produce uniform arrival patterns as explained above will be called the PRIMARY corners of the network of FIG. 4.

Let it be assumed that one time unit is the time it takes for a message to go from module to the next. When being propagated from a source, the general message will travel to a module along the shortest possible path that exists to that module. Thus general message arrival times can easily be determined by counting the modules between a source and a given module, along the shortest possible path. In FIG. 4 it will, therefore, be seen that module $H^1$, $H^2$ and $H^3$ will receive the general message for the first time in one time unit after the emission starts from H. Module $H^4$– $H^9$ receive the general message at time 2. It can at once be seen that propagation "isotime" lines are concentric triangles and in anyone region such as HBA'C they are parallel lines.

The network AC'BA'CB' of FIG. 4 appears in FIG. 5 with sides extended so as to form a star network. Associated with each PRIMARY corner there are two STARPOINTS. Facing the network from a primary corner, the starpoint on the right will be called a RIGHT STARPOINT to be referred to here as RSP and the one on the left will be termed LEFT STARPOINT abbreviated as LSP. Thus for corner C we have $RSP_c$ and $LSP_c$ as shown in FIG. 5 and similarly for corners A and B. When a general message is emitted from either RSP or LSP a uniform arrival pattern is produced upon the network AC'BA'CB' which is the same as that which results from emissions from the associated primary corner. Thus $RSP_c$ and $LSP_c$ as well as corner C emissions cause simultaneous arrivals on input channels 3 and 5. For instance module $C^{21}$ in FIG. 5 receives the general message from $RSP_c$ on channels 3 and 5. This has been so shown with solid arrowheads (▼). $C^{25}$ receives the general message from primary corner C also on channels 3 and 5 as shown with solid arrowheads with a bar ($\bar{▼}$). In a similar way module $C^5$ toward the center of the network in FIG. 5 will receive the general message from either $RSP_c$ or $LSP_c$ or C on channels 3 and 5.

It will now be shown that while RSP and LSP produce the same arrival pattern upon each module in the network, the time elapsed between the initiation of the general message and the receipt of a response message from a given module will be different for RSP and LSP. The method for determining this elasped time will also be given and this method will be used in the pattern recognition application to be explained shortly.

Certain terms referred to hereinafter are defined as follows:

TRACK: a line formed by the alignment of channels, for example lines $n_1$–$n_1'$, $n_2$–$n_2'$, and $n_3$–$n_3'$ near $LSP_c$ or lines $n_4$–$n_4'$ and $n_5$–$n'_5$ near $RSP_c$.

ASSOCIATED TRACKS OF A STARPOINT: Tracks that are opposite a starpoint; thus lines $n_1$–$n'_1$, $n_2$–$n'_2$ etc. are opposite $LSP_c$ and hence are the associated tracks of $LSP_c$. The associated tracks of $RSP_c$ are $n_4$–$n'_4$, $n_5$–$n'_5$ etc.

RESPONSE RETURN TIME (abbreviated as RRT): The time elapsed between the initiation of a general message from a given module and the arrival of a particular response at the same module. For example, RRT for a response from $C^{21}$ to a general message from $RSP_c$ is 6 because by the shortest path the general message will arrive at $C^{21}$ in three time units. The response will take three time units to reach $RSP_c$ by the application of response routing rules of Table 1 thus giving an RRT of six.

By virtue of the construction of the network in FIG. 5, for a given starpoint, RRT's are all equal for responses from modules along the associated tracks of that starpoint. For instance one of associated tracks of $RSP_c$ is $n_4$–$n'_4$. Thus RRT's for $C^{23}$ and $C^{24}$ are all three units of time as is readily apparent in FIG. 5. Another associated track of $RSP_c$ is $n_5$–$n'_5$ and for $C^{20}$, $C^{21}$, and $C^{22}$, which lie on this track, RRT is six. For modules along $n_6$–$n'_6$ RRT is nine. It is apparent that each additional associated track adds three time units to RRT. Hence if we redefine the time unit as being equal to three old time units, then each additional associated track we traverse will mean one more unit added to RRT. In terms of this new convention then RRT at $RSP_c$ for modules along $n_4$–$n'_4$ is one, for modules along $n_5$–$n'_5$ it is two and so on.

Now we can readily determine the response return time from a given module in the network to a given starpoint by merely counting the number of associated tracks that lie between the given starpoint and the given module. By this method it is readily apparent that RRT of a response from $C^5$ to $RSP_a$ is seven whereas RRT from $C^5$ to $LSP_a$ is eight (new) time units.

We have then established three facts for the network in FIG. 5: 1. The left or right starpoints (LSP or RSP) of a primary corner (A,B, or C) will create the same general message arrival pattern upon the channels of modules in the network AC'BA+CB' as the primary corner; 2. When a general message is emitted from a primary corner or from either of its starpoints, the general message arrival pattern will be the same for all non-edge modules of the said network; and 3. The response return time (RRT) of a response from a given module to a starpoint can be determined by counting the number of associated tracks from the starpoint to the responding module, the associated tracks of a starpoint being the tracks opposite it.

We now indicate the rules by which the network will attain the indicated types of recognition:

1. Each of the six starpoints will sequentially inject a general message into the network in a form which will be called UNCODED.

2. When a general message arrives at a module (and as shown earlier it will arrive simultaneously upon two channels of the interior modules):

a. If the module receiving it had been "activated" or "turned on" by its associated photocells, then the module will send, on all outgoing channels, a CODED general message whether the message had arrived coded or uncoded. Clearly the "code" merely indicates that the transmitting module is in the "active" state. The code could be the presence of a prefix, or the state of a single prefix bit; "0" showing the uncoded state and "1" showing the coded state.

b. If the module is "inactive" or "quiescent," whether the incoming general message was coded or not, it will send an UNCODED general message on all outgoing channels.

3. (Response Rule) If the module is in the activated state and the general message had arrived simultaneously in UNCODED form in BOTH of the two incoming channels involved, then that module will emit a RESPONSE MESSAGE along the channel determined by the rules in Table 1, after having transmitted a (coded) general message on all outgoing channels.

The recognition of angles, lengths, curvature etc. is achieved through the analysis of responses thus generated and received at the starpoint from where the general message had originated.

The Response Rule has been applied to the image produced by the straightline LL' in FIG. 5. As was shown earlier only modules $C^1$–$C^{19}$ are "activated" by this image. Whether the general message is emitted from $RSP_c$ or $LSP_c$ it will arrive upon $C^1$ in uncoded form simultaneously on channels 3 and 5 since both starpoints produce the same arrival patterns (shown earlier) and since both $C^{26}$ and $C^{27}$ are "quiescent"(-therefore emit uncoded general messages). Therefore $C^1$ will send a response or "respond" to $RSP_c$ or $LSP_c$. Similarly $C^4$, $C^6$ and $C^9$ will response. All these modules have been circled. On the other hand $C^2$, $C^3$, $C^5$ etc. will not respond because they receive the general message in coded form at least along one channel.

As was shown earlier the response return times at a starpoint (RRT's) can be easily determined by counting the number of associated tracks between a starpoint and the responding module. Thus RRT's at $RSP_c$ for $C^1$, $C^4$, $C^6$, and $C^9$ are 5, 7, 8 and 10 respectively whereas at $LSP_c$ we have 9, 8, 7, and 6. Let us arbitrarily have the smallest RRT mark time "zero." This way we need to count only the associate tracks between responding modules. Thus "adjusted" RRT's for $C^1$, $C^4$, $C^6$ and $C^9$ become 0, 2, 3, 5 at $RSP_c$ and 3, 2, 1, 0 at $LSP_c$.

Let the average response return time (adjusted), denoted as $\bar{1}$, be defined as follows: $\bar{1}$ = Maximum adjusted RRT/Number of responses received −1 or $1.\underline{0}$ whichever is greater Thus for the line $LL^1$ in FIG. 5, $\bar{1}$ at $RSP_c$ is five-thirds or 1.66 and at $LSP_c$, $\bar{1}$ is 3/3 or 1.0.

The procedure involved here is one of transformation of the portion of the image seen by a starpoint into a sequence of responses. The average response return time, $\bar{1}$, is a summary representation of this sequence. When an image is projected into the network, the average intervals noted at all the starpoints are thus the transformed representation of that image and as such can be used to identify that image FIG. 6 reproduces the network of FIG. 5 with a 60° rotation. Thus corner A appears on the left. Channel directions have not been shown since these are readily apparent. Projected onto the network is th image of letter B. Heavy circular dots indicate the activated modules. Modules 1 – X respond to $LSP_A$ and $RSP_A$ and are shown circled. Those responding to $RSP_B$ and $LSP_B$ appear in squares. Modules in triangles are the ones that respond to $LSP_c$ and $RSP_c$.

Consider $LSP_A$. It receives ten responses. The first to come is the response from Module 1. This marks time zero. The last response to come is from X. This will come at time 15 because there are fifteen associated track lines of $LSP_A$ between 1 and X. Thus the average response time at $LSP_A$ is 15/(10–1) or 1.7. Other values of $\bar{l}$ are:

$$\bar{l} \text{ at } RSP_A = 12/9 = 1.3$$
$$\bar{l} \text{ at } RSP_B = 9/2 = 4.5$$
$$\bar{l} \text{ at } LSP_B = 3/2 = 1.5$$
$$\bar{l} \text{ at } RSP_c = 1$$
$$\bar{l} \text{ at } LSP_c = 1$$

This sequence of average response return times is the representation of letter B as seen by the network. The recognition of B at a later time would be accomplished by obtaining a match between the above sequence of intervals and the actual sequence obtained at that later time.

The network of FIG. 5 is reproduced in FIG. 7 without any rotation. Images of straight line segments L1, L2, L3, and L4, and curved segments C1, C2, and C3 are shown together with their network representations as indicated by heavy dots. The modules that respond to a general message from either $RSP_c$ or $LSP_c$ have been circled. Although for comparative purposes all segments appear together, the remarks to be made are with respect to the situation when only one segment at a time appears.

As a consideration of the response rules will indicate and as is also apparent in FIGS. 5, 6, and 7, responses to the starpoints of a corner will come from the edges of the image that face that corner. Thus the responses to starpoints of all three corners represent the edges or the boundaries of an image projected upon the network. As such the network of the invention can be used as an edge detector.

Furthermore, by examining the time sequence of responses received at starpoints, the nature of the edge can be detected. In particular the following are true: When the edge is straight, the time intervals between responses received at one of the starpoints remain approximately the same; if the edge is convex, at both starpoints of the corner facing the edge the intervals will start increasing after a series of unit intervals; if the edge is concave, at both starpoints of the corner facing the edge the intervals will start large and progressively decrease and then a series of unit intervals will be encountered. These effects become more pronounced as the density of the network (number of modules per unit area) increases.

Consider the convex edge C3 in FIG. 7. $RSP_c$ will first receive $Z^1$ since it is on the nearest associated track of $RSP_c$. Counting the associated tracks between responses will at once reveal that $Z^2$–$Z^9$ will arrive with unit intervals. $Z^{10}$ will follow $Z^9$ with an interval of two time units; $Z^{12}$ will come after three times units and so on. At $LSP_c$ $Z^{13}$–$Z^5$ will come with unit intervals and $Z^4$–$Z^1$ will arrive with increasing intervals.

Let us now consider the concave edge C1. $X^1$ will reach $RSP_c$ first. $X^2$ will follow after four time units. $X^3$ will come two time units after $X^2$. The same holds for $X^4$ with respect to $X^3$. However, $X^5$–$X^{12}$ will come with unit intervals. The same behavior of large intervals diminishing to unit intervals holds true at $LSP_c$, too.

On the other hand, all of the responses $Y^2$ – $Y^5$ from the straight edge L4 reach $RSP_c$ with intervals of approximately two time units. These are received with unit intervals at $LSP_c$.

Hence the network can be used to indicate whether an edge is concave, convex, or straight.

The network can also determine the angular orientation and the length of a straight edge.

In FIG. 7, L1 is seen to give only one response to corner C starpoints. L2 yields four responses; L3 sends seven, and L4, five. All lines are of the same length. So it is clear that it is the angular orientation that accounts for the differences in responses received at corner C starpoints. It is evident that in the case of corner C, maximum responses are obtained when a line is vertical. Number of responses approach one as the angle approaches ± 30° of the vertical. More importantly the average response return times also change as the angle changes. Since this is not based on the length, it can be used to estimate the angle regardless of the length of a line. The average response return times for lines L2, L3, and L4 are shown in Table III. L1 will be discussed later.

TABLE III

| | L2 | L3 | L4 |
|---|---|---|---|
| $RSP_c$ | 1 | 1 | 2.0 |
| $LSP_c$ | 3.0 | 1 | 1 |

Let the vertical be defined as 0° and clockwise angles be positive. It appears that at 0°, both starpoints register an $\bar{l}$ of 1.0. As the angle increases toward 30°, $\bar{l}$ at $RSP_c$ increases, whereas at $LSP_c$, $\bar{l}$ remains at 1.0. For angles less than zero and up to –30°, the opposite occurs. Thus $RSP_c$ is sensitive to angles between 0° and 30° whereas $LSP_c$ is sensitive to angles between 0° and –30°. Since corner B is rotated 60° with respect to C, and is identical to it otherwise it follows that $RSP_B$ and $LSP_B$ together will be sensitive to angles between 30° and 90°. Corner A is identical to B or C except for a 60° rotation. Therefore, $RSP_A$ and $LSP_A$ will be sensitive to angles between 150° and 90°. Since we had started with –30°, the ranges of all three sets of starpoints cover all possible angles i.e., 0° to 180°.

Line L1, although having the same length as the others, gives only one response, $W^1$. All the other activated modules along L1 receive a coded general message along at least one channel hence send no responses. The angle of L1 is –30°. If it were 30° again there would only be a single response irrespective of length. A slight rotation of the network, however, will cause multiplicity of responses and bring L1 into the sensitivity range of one of the starpoints.

The range within which the angle of a line lies can be determined by identifying the starpoint which has the highest average response return time. For L2 this is $LSP_c$, as shown in Table III. Thus L2 must be between –30° and 0° which is the sensitivity range of $LSP_c$. Having thus determined which 30° interval the angle of the line is in, a precise value within this range can be obtained from the following formula:

$$\theta \times \tan^{-1}[(\bar{l}-1)/(\bar{l}+1) \qquad (\sqrt{3}/3)]$$

where $\theta$ is the angle between 0° and 30° and $\bar{l}$ is themaximum of the average response return times received at the two starpoints of the corner facing the edge.

The true angles for L2, L3 and L4 are −16.6°, 0°, and 11.3° respectively. Values computed from the above formula are −16.2°, 0°, and 11.0°.

Examining lines L2–L4 in FIG. 7 will indicate that, when a straight edge is within the sensitivity range of the two starpoints associated with the corner facing the edge, increasing the length of the edge will also increase the number of responses. The increase in responses obtained for a given increase in length will depend on the angle of the edge. Thus if we noted the number of responses and the angle, we can determine the length of an edge in terms of channel lengths. Since angle is itself determinable from the larger one of the average response return times at the starpoints, it follows then, that length can be determined from the number of responses received, n, and $\bar{l}$, as indicated by the following formula.

$$\text{length} \times (n-1)\sqrt{\bar{l}^2+\bar{l}+1}$$

All segments L1–L4 are of 11 channel lengths. Application of the above formula to L1–L4 give 0, 10.2, 10.4, and 10.6. "Zero" length of L1 reflects the fact that L1 is not really in the sensitivity ranges of $RSP_c$ and $LSP_c$. These starpoints "see" only the tip of L1. The values for L2–L4 are all in good agreement, especially in view of the discretization of an image in obtaining the network representation.

Having determined that an edge is convex from the fact that after a series of unit intervals responses come with increasing intervals, the average curvature can be computed. Let N be the number of responses encountered after the first response of an interval greater than one; and let T be the time over which these responses were received. Then the curvature (radius) in terms of channel lengths is given by:

$$r=\frac{3}{4}\left[\frac{T+N}{\sqrt{T-N+1}-1}\right]^2$$

The T and N values for C2 and C3 at $RSP_c$ and $LSP_c$ are shown in Table IV.

TABLE IV

| | $RSP_c$ | | $LSP_c$ | |
|---|---|---|---|---|
| | T | N | T | N |
| C2: | 7 | 2 | 6 | 2 |
| C3: | 9 | 3 | 8 | 3 |

The true radii of C2 and C3 are 30 and 41, respectively. The averages of the computed radii at the two starpoints are 30 for C2 and 42 for C3. Again, the agreement is quite good.

The design of the logic-memory modules will now be considered first in the context of the communication method as embodied in the networks of FIGS. 2, 3 and 4 and then in the context of pattern recognition as embodied in the networks of FIGS. 5, 6 and 7.

The modules involve rather elementary and well-known logic and memory circuits which may assume a wide variety of forms. A functional block diagram is shown in FIG. 8 for the example of the square module configuration of FIGS. 1F and 3; it being understood, however, that other wellknown circuit arrangements may readily be substituted therefore and that the other modules of FIG. 1 may be similarly appropriately constructed.

Referring to FIG. 8 for illustration of the broad principles of operation, the incoming channels 1 and 2 are shown as applying input messages to component 1A. If the incoming message is determined to be a general message, information on the identity of the channel(s) upon which the general message first arrived is stored in memory, so-labelled, along with the identifier of that message, assuming the message is not rejected as hereinafter described. The general message is led to all outgoing channels by block 2B. Whenever a general message arrives on one channel only, the same message arrives a short time later upon other channels, which later arrivals should be rejected and not propagated. Comparator 2A performs this rejection function by comparing the identifier of an incoming general message with the identifiers stored in memory. If a match is obtained the incoming general message is discarded.

If the incoming message is determined to be a response by 1A, the arrival code of the corresponding general message is retrived from memory via the comparator 3A; and according to this code, the response is routed through 4A to the appropriate outgoing channel, in accordance with rules given in Table II and implemented in FIG. 3.

FIGS. 9 and 10 illustrate complete block diagrams for a practical module of the type shown in FIG. 1F including typical connections for inputing and outputing of messages. Certain of the functional blocks of FIG. 8, such as 2A and 3A, appear in greater detail in FIGS. 9 and 10.

In FIG. 9, each signal on any incoming channel is shown as containing the following seven bits on seven parallel conductors of the channel (Subscripts denote channel numbers of FIG. 1F); enable bit E, response/-general message bit R, and five identifier bits Mo–M4. The number of identifier bits is arbitrary and any number can be chosen with appropriate modifications in the design. Provision is made for inputs from a device (such as a computer) and for outputs to the same, all such output and input provisions being subscripted with D for device.

Incoming lines are led through a group of inverters and NOR gates (13–18) to provide a signal at a NOR gate output whenever a signal appears on any incoming channel 1, 2, or D. Signals from the NOR gates are applied to the temporary memory 19 along with channel 1 and 2 enable signals $E_1$ and $E_2$ so that they will be available for later use. (The temporary storage output signals are prefixed with the letter S to indicate that they have been stored). The $E_{in}$ signal from NOR gate 1 is used to enable the temporary storage 19 and to trigger a series of one shot multivibrators 2, 3, and 4 which provide a timing delay for loading the memory and sending output signals.

The identifier bits SMO-SM4 in temporary storage 19 are immediately connected to coincident comparators 0′–3′ for comparison with identifiers which may be stored in the memories of these comparator-memory blocks. Although four such blocks are shown, any number can be employed. (A typical comparator-memory block is detailed in FIG. 10.) Since blocks 2A and 3A in FIG. 8 are both comparators and their functions are much alike, the two employ common components in FIGS. 9 and 10. Components that correspond to blocks in FIG. 8 have been so shown with dotted borders. For instance, I and J in FIG. 10 belong to block 3A of FIG. 8. Elements 20, 23, 24 and 25 in FIG. 9 constitute the continuation of 2A in FIG. 8.

If comparison between input message identifier bits $SM_0$–$SM_4$ and previous such bits stored in memory blocks 0′–3′ is achieved at C, D, E, F, and G in FIG. 10, gates H's output XTRUE (prefix X denotes block number 0′–3 ′) indicates that this memory block contains a match. This match signal performs two functions. First it enables the NOR gate 20 which produces a TRUE signal indicating that this identifier is available in memory. Secondly it enables the $E_1$OUT and $E_2$OUT signals (by application of the signals from I and J to NOR gates 21 and 22) which designate the incoming channel number(s) of the corresponding general message previously stored i.e. the general message arrival code. These channel signals and their inverses are connected to the NAND gates 27 and 29 which do the routing exactly in accordance with the routing rules in Table II. These routing gates in turn enable the output gates for the appropriate response channel unless a SEND ALL or an E SEND is generate at 26 or 25. If the SR bit at 19 is "off" (indicating an incoming general message) and the TRUE signal at 25 is not produced (indicating that this message was not previously stored in memory) then a STORE and SEND ALL signal is generated at 26. This signal enables all output channels through a series of three NOR gates 29-31 used by this signal and the routing control signals. The STORE and SEND ALL signal also enables the MEM LOAD signal at gate A in FIG. 10 which is used along with a counter signal 0′–3′ at gates 9–12, to load the next memory block of blocks 0′–3′ with the incoming identifier bits SMO-SM4. After the memory load has been completed, a one-shot multivibrator 6 steps the counters 7 and 9 to the next location in preparation for the next MEM LOAD signal for loading the memory of the next of blocks 0′–3′. In FIG. 10 input "X" at gate A denotes the counter signal 0′–3′.

On the other hand, if the stored response bit SR is "off" and the general message had been stored in memory or if the stored response bit SR is "on" indicating a response message and no corresponding general message exists in memory than the $\overline{\text{E SEND}}$ signal is inhibited by 23–25 which prevents any outgoing signals from being sent. The NAND gates 32–52 and inverter drivers on the outgoing lines perform the sending or inhibiting function for each outgoing line. Subscripts denote channel numbers.

Component 1A of FIG. 8 is not shown in FIG. 9 because in the detail design advantage is taken of the fact that a separation need not be made between a response and a general message until the memory is searched for an identifier. As can be seen in FIG. 9 the function of component 1A is accomplished in the following way: If the identifier is not in memory (TRUE) and the response bit is "off" (general message condition) then 26 enables 29, 30, and 31 to send the message on all outgoing channels. Otherwise the message is routed by 4A according to the associated general message channel arrival pattern.

The grouping of elements in FIGS. 9 and 10 is dictated by design considerations and ease of connection and not necessarily by the sequence of functions shown in FIG. 8. Also serial data handling might be employed.

The logic-memory module of FIG. 1D in the pattern recognition implementation would basically manifest the approach in FIG. 9. The special requirements however necessitate some additions and also allow some simplifications. In particular since the starpoints emit general messages sequentially, there is no need to have memory blocks to store identifiers. On the other hand the module must perform the following additional functions: 1) Recognize whether a general message is coded or uncoded; 2) Recognize whether the photocell is on or off; 3) Code or uncode an outgoing general message depending on whether the module is activated or not; 4) Emit a response when the module is in the activated state and there are two simultaneous arrivals of an uncoded general message.

FIG. 11 shows the block diagram of a hexagonal Class K module in the pattern recognition mode. Each of the three incoming channels can contain five bits of information: enable E to indicate the presence of a message, response R to indicate a response or a general message, uncoded U to indicate whether the general message has been previously coded, and two bits of count CO and Cl to indicate how many response messages are represented in the incoming response. This is needed because if two responding modules lie on the same associated track, their response return times will be identical and hence somewhere along the way to the starpoint they will both converge upon a module simultaneously. Since that module sends out a single response, it must indicate that two responses are represented in that outgoing response. This is done with the counter bits. To allow for simultaneous arrival of a "double" response and a single response, etc. two count bits have been employed. Thus a single response can represent up to four. If more is warranted this can be achieved by simply adding additional count bits.

With the exception of enable, all incoming signals are led through NOR gate P13–P17 to generate signals whenever any of the corresponding input signals are present. The enable signals are connected in pairs to NAND gates P1–P3 to generate signals whenever two simultaneous arrivals occur. If so, then a "2" signal is produced at P4, which is used in the routing gates P26–P28 and also for counting. The routing gates P26–P28 embody the rules given in Table 1 for Class K module. The outputs of gates P29–P31, which indicate the appropriate routes, are made available for storage in latch P32.

In gate P7 and flip-flop P8, the inverse of the response bit, i.e., the general message condition, is combined with the input phase of the clock (explained a little later) to provide a signal which in gate P9 inhibits alternate occurrences of the general message thus rejecting the general message received subsequent to the first arrival. This output (labeled S ALL for send all) is gated through P36–P38 to be stored as the enable bit in latches P51 and P52. The S ALL is also gated in P10 with the photocell signal PC and the output of P10 is gated with $\overline{R}$ to generate an uncode bit $U_{out}$. So depending on whether PC is on or off or the module is activated or not an appropriate general message can be sent. $U_{out}$ is stored in latches P51, P52 via P40, P44, and P48. The last function of S ALL is to enable latch P32 which stores the routing information produced by P29–P31. PC is on when any of the six photocells associated with a module is on.

If the message is a response then gate P14 generates $R_{out}$ which enables P33–P35 and loads a response into latches P51 and P52. Simultaneously gates P18–P25 either transfer the count bits into the appropriate latch positions, or if two responses had arrived simultaneously, they add the response counts and pass the sum as $CO_{out}$ to appropriate latch positions.

The latches P51–P54 makes use of a two phase clock (labeled ICLOCK OCLOCK) to generate signals and to make them available for sending. On the first phase of clock (ICLOCK), latches P51 and P52 are loaded from the incoming signals as described above. At the end of this phase, the signals become available at the output of latches P51 and P52. Shortly after the input phase, the output phase begins (OCLOCK). During this phase the signals are loaded into the output latches P53 and P54 where they are held for use in adjacent modules during the next input phase. Note that the delayed response signal from gate P12 also traverses this route which causes the WAIT signal to be generated during the following input cycle. This WAIT is then used to generate a response on the next cycle via gate P14 and R OUT, if the response conditions are fulfilled, i.e., module is activated and two uncoded general messages arrive simultaneously.

The invention in the pattern recognition mode would best be utilized in conjunction with a minicomputer which would cause the initiation of general messages sequentially at the six starpoints. The minicomputer could easily extract the response sequence received at a starpoint and determine the number of responses in the sequence and also compute the average response return times. However, circuitry will be described which will allow the starpoints (corners) to initiate a general message upon a signal from the computer, do the response counting and determine the time over which the responses arrived, and pass the results on to the minicomputer. Again this is for illustrative purposes only and other configurations are possible.

FIG. 12 depicts the block diagram of the circuitry. The leading edge of the start pulse from the computer, which must be synchronous with OCLOCK and which is received at block 7A, generates a clear signal. This signal clears the counters 7C and 7C' and the adder 7D and also at 7B combines with the OCLOCK to generate an outgoing general message (represented by E', R', U', CI', and C0') to the network. (These bits were explained in conjunction with FIG. 11). This way the signal from the computer causes the emission of a general message at a starpoint.

Starting with the ICLOCK pulse, the counters 7C and 7C' start counting block (time) pulses. This provides a way for keeping track of time.

When the first response arrives at the input lines E, R, U, CI, and CO, the enable E, response R, and uncode U signals combine to cause the adder 7D to add +1 to the total stored in latches 7E' and 7E'' whose starting values are −1. Thus initial count is set at zero. This signal from the gating of E, R, and U also store the current clock counts of 7C and 7C' in both of the latches 7E'''9 and 7E''''. In this manner the time of arrival of the response is recorded.

As other messages arrive, the E, R, and U bits are examined and if they are response messages, they add their counts CO and CI to the count stored in latches 7E' and 7E'' and cause the current value of clock (i.e., the arrival time) to be stored in 7E'''. Latch 7E'''' retains its original time count, since its clock signal was disabled after the first response.

Thus when responses cease to come, the computer obtains the response count from 7E'', the time of the first response arrival from 7E'''' and the time of the last response message from 7E'''.

I claim:

1. A network system comprising a plurality of memory-logic module units each having input and output channels and adapted to receive information request and response messages and, depending upon which of those message types is received, to transmit an output message in a certain manner, means for connecting groups of said module units in polygonic assemblies successively at least in part circumscribing one another and means for connecting each module unit of an assembly to adjacent units of another assembly, said connecting means each comprising connections between an output channel of a unit and an input channel of the unit connected thereto, each unit being provided with means for detecting the channel on which an information request message first arrives at that unit.

2. A network system as claimed in claim 1 and in which any unit may serve as a message source to initiate an information request message having predetermined characteristics that propagates through said connecting means to all other units, the logic of each unit having means operating in accordance with a predetermined algorithm o transmit an output message to the units to which it is connected.

3. A network system as claimed in claim 2 and in which the logic of said units comprises means responsive to receipt of an information request message along input channels for transmitting a response message along an output channel and through said connections back to the message source unit.

4. A network system as claimed in claim 1 and in which the channels of the module units are arranged in accordance with predetermined classes.

5. A network system as claimed in claim 4 and in which the system comprises a combination of module units from different classes.

6. A network system as claimed in claim 5 and in which three input and three output channels are provided for each module unit.

7. A network system as claimed in claim 1 and in which each module unit has means for storing information as to the input channel along which an information request message is first received by that unit.

8. A network system as claimed in claim 7 and in which each module unit is further provided with means responsive to a response message for associating that message with the corresponding stored information and transmitting the response message along a channel determined by the stored information.

9. A network system as claimed in claim 7 and in which said module units have means for rejecting subsequent arrivals of earlier received information request messages.

10. A network system as claimed in claim 1 and in which said system has means to produce geometric patterns thereon to be recognized, means for introducing into the system information request messages from a plurality of different regions thereof, means for producing responses to those messages from at least some of the module units disposed within said patterns, and means for detecting the responses, thereby to identify the patterns.

11. A method of communication within a network having a plurality of memory-logic units interconnected by cooperating input and output channels, that comprises, transmitting an information request message from at least one module unit along such channels connected thereto, detecting the first arrival of said message at any module unit and storing information relating to the channel of that module unit which first received the message, re-transmitting the message from that module unit to adjacent module units, receiving a response message at that module unit from another module unit, associating the response message with the stored information, and transmitting the response message from that module unit along a channel depending upon the stored information.

12. A communication network system in which messages may be propagated throughout the system network without the aid of a central processor, which comprises a plurality of module units each having input and output channels, said units being arranged in an array with the output channels of each unit connected to the input channels of adjacent units only, and vice versa, to form the network, but with each module unit communicating with every other module unit in the network through said connections, and means for introducing messages into said network, each of said module units having means for controlling on which output channels thereof messages are to be transmitted therefrom depending upon the arrival pattern of messages received on the input channels thereof.

13. A system as claimed in claim 12 and in which said introducing means comprises means for introducing information request messages into said network and means for introducing response messages into said network in response to said information request messages, said controlling means of said module units having means for recognizing an information request message received on input channels thereof and for transmitting that message on all output channels thereof upon the first receipt of such information request message and having means for transmitting on particular output channels thereof a response message received on input channels thereof depending upon on which of the input channels thereof the corresponding information request message was first received.

14. A system as claimed in claim 13 and in which said controlling means of said module units comprises means for preventing the transmission therefrom of information request messages received thereby subsequent to the first receipt and of response messages for which a corresponding information request message has not been recognized.

15. A system as claimed in claim 13 and in which said controlling means of said module units comprises memory means for storing identifiers of information request messages and for storing the arrival pattern of such messages.

16. A system as claimed in claim 12 and in which said controlling means of said module units comprises a logic unit having means for switching output channels in accordance with a predetermined algorithm independent of other modules.

17. A system as claimed in claim 12 and in which each of said channels is a one-way channel.

18. A system as claimed in claim 12 and in which said network is hexagonal.

19. A system as claimed in claim 12 and in which said network is star-shaped and has means for introducing messages into the network at the start points thereof.

20. A method of communication and pattern recognition within a network comprising a multiplicity of memory-logic module units interconnected by cooperating input and output channels that comprises applying a geometric pattern to the network to provide a pattern of module units corresponding to such geometric pattern, initiating a plurality of general messages at each of a corresponding plurality of module units disposed near the periphery of the network to communicate such messages throughout the network, returning responses to such messages from certain of the module units of said pattern of module units, and indicating for each general message at least one of: the number of such returned responses, the time intervals between such responses, the time sequence of such responses, and the average response time.

21. A method as claimed in claim 20 and in which the network is star-shaped and the plurality of module units are located at star points of the network.

22. A method as claimed in claim 21 and in which the general messages are initiated at the star points in sequence and the average response time is derived from the responses at the star points in sequence.

* * * * *